3,214,355
PROCESS FOR THE FILLING OF PORES OF METALLIC OR METALLIC COATED FRAMES WITH METALLIC HYDROXIDES AND PRODUCTS THEREOF

Ludwig Kandler, Aelescherstrasse 10, Munich-Solln, Germany
No Drawing. Continuation of application Ser. No. 837,332, Sept. 1, 1959. This application May 24, 1962, Ser. No. 197,292
Claims priority, application Germany, Sept. 3, 1958, K 35,669
10 Claims. (Cl. 204—56)

This application is a continuation of my copending application Serial No. 837,332, filed September 1, 1959, now abandoned.

This invention relates to galvanic elements and batteries and to process and more particularly to a process for filling the pores of metallic or surface metallized frames with active material with the aid of metallic oxides or metallic hydroxides. It also relates to positive and negative electrodes for alkaline batteries, to batteries containing such electrodes and to electrodes for electrolytic condensers or the like, and to condensers equipped with such electrodes. It also relates to production of highly active catalyzers.

It is already known that it is of great importance for the efficiency of galvanic elements and batteries that the transformation of matter which is taking place at the electrodes and which is capable of supplying electric energy, should take place with the least possible interference and that the highest possible percentage of the total available quantities of substances should participate in the electro-chemical process. These demands may be best complied with, the more porous the active electrode substances are and the larger the really attainable surface of the reacting substances is in comparison with the geometrical dimensions of the electrodes. By making use of porous active masses within a supporting frame it is possible, as already known, to comply more or less with the above demands.

For instance, a suitable supporting frame may be composed of a porous sintered layer of metal powders which do not react with the electrolyte and which do not exert any influence on the electro-chemical process. However, electrically conductive porous supports made of plastic, glass wool, etc., may also be used.

In the pores of such frames the active masses (finely distributed metals or metal alloys) are inserted. Up to now the insertion was achieved by a chemical impregnation process, as for instance the preferred method in the manufacture of electrodes for alkaline batteries whereby the porous electrode frames were dipped into a solution of cadmium or nickel salts, then dried and subsequently dipped into an alkali. During that process cadmium or nickel hydroxides are precipitated into the pores of the electrode frame. By repeating this process a few times the pores are filled to a considerable extent with cadmium or nickel hydroxide. By an electro-chemical process of electrolytic reduction in the alkaline electrolytes the cadmium hydroxide is transformed into finely distributed porous cadmium metal, or by means of an electrolytic oxidation the bivalent nickel hydroxide is transformed into the trivalent nickel hydroxide. Such already known processes for filling of pores of the electrode frames with the aid of electro-chemical active substances are very tedious and require, because of the repeated drying steps during the repetition of the filling, a considerable amount of energy.

There is also already known a process for the filling of the pores of the electrode body whereby the electrode body which has already been impregnated with a metallic salt solution is polarized cathodically in an alkaline solution so as to obtain an evenly distributed filling of the pores with the active mass.

Principal objects and features of the present invention are the provision of novel processes for preparing electrodes and for filling their pores with active materials by methodic polarization treatment which provides material advantages over the processes heretofore known, by way of greatly speeded up production as compared with those processes now extant, lower energy consumption in practicing the new method as compared with known methods, lower consumption of chemicals as compared with chemical pore filling processes as heretofore practiced, very fine and even distribution of active masses into the pores of the electrode frame body and as a result substantially 100% participation of the active masses within the electrode pores during charging and discharging of batteries and condensers equipped with electrodes prepared according to the process.

Additional objects and features of the invention will become apparent from the following detailed specification, it being understood that the details as set forth hereinafter are by way of example and not of limitation.

In accordance with the procedure of this invention, the pores of metallic or metal-coated frames are filled with metal-oxides or metal-hydroxides by cathodic polarization in such manner that between a soluble or non-soluble anode and the body of the frame acting as a cathode there is produced an electrolysis in an acid electrolyte which contains the metal ions which are to be thrown off as oxides or hydroxides, and also the reducible ions which have a redox potential that is more positive than the cast-off potential of the metal ions. During this process while electrolysis takes place in the electrolyte space, there is maintained outside of the cathode a pH value of the electrolyte which does not permit any precipitations of metallic hydroxide within the electrolyte.

The body of the frame is dipped as a cathode into an acid electrolyte solution which contains the metal to be exuded in the form of ions. Due to the fact that the electrolyte contains ions having a more positive redox potential than the discharge potential of the metal ions, there is no discharge of metal ions during the electrolysis at the cathode, but instead a reduction of the ions with the more positive redox potential, using up hydrogen ions. The consumption of the hydrogen ions causes the increase of the pH value of the electrolytic solution within the pores of the frame body. On the outer surface of the frame body the increase of the pH value is reduced by the subsequent diffusion of the hydrogen ions which are contained in an excessive amount within the acid electrolyte. However, within the pores the rate of consumption of hydrogen ions is considerably larger than rate of diffusion and therefore the eletrolyte becomes alkaline. This provides, as a consequence, a precipitation of metallic hydroxide.

Due to the increase in diffusion resistance the hydroxide precipitation starts at the most inapproachable or inaccessible portions of the frame support, meaning that the pores of the frame or base are filled in the most advantageous manner from inside-out with metallic hydroxide. It is therefore possible by electro-chemical means to fill all accessible pores with a very finely distributed porous active mass, even in the case of frames of several millimeters thickness, such as for instance 2 to 5 mm. thickness.

The metal hydroxides which have been deposited according to the invention into the pores may then, according to the already know methods, be reduced by electrolysis into finely divided metals or may by electrolytic oxidation be transformed into oxides of a higher value.

It is, for instance, possible to build very effective solution anodes or depolarization cathodes for galvanic elements and batteries. The process of the invention of filling by electro-chemical means the pores of body frames with very thinly divided porous active masses can be used, aside from the manufacture of cadmium or nickel electrodes for batteries, in a quite general manner for the precipitation of metallic oxides or hydroxides in porous frame materials. The essential requirement is the presence of ions which are reduced with the aid of cathodic polarization with simultaneous consumption of hydrogen ions whereby the electrolyte dissolution takes place within the pores and the electrolyte becomes alkaline within the pores of the frame and causes the hydroxides to precipitate in the pores. In the electrolyte outside of the body frame there is maintained a pH value which does not permit a precipitation of metal hydroxides.

Especially suitable ions for this purpose are nitrate ions. However, also all other ions with a high redox potential, as chromium acid ions, chlorate ions and permanganate ions may be used. It is therefore possible, for instance, to manufatcure, aside from electrodes of galvanic elements and batteries, active layers of electrodes of electrolytic condensers as well as highly active catalyzers in a very efficient way by making use of the method of the invention.

The maintenance of a pH value during the electrolysis which does not permit the precipitation of metal hydroxides in the electrolytic space outside of the frame body can be achieved by using anodes out of which metal ions are going into solution during the electrolysis and by a metered addition of acids, such as for instance nitric acid.

With the aid of a pH measuring apparatus this addition can be automatically controlled. It may also be of advantage to keep the electrolyte with the aid of a circulating pump, equivalent to mechanical mixing, in a continuous flowing motion and/or to keep the cathodes in the electrolyte during the electrolysis in motion so that at every point of the electrolytic space the desired pH value is attained.

The maintenance of the pH value found to be ideal for electrolysis may also be achieved by using as materials for the anodes such substances as for instance passive nickel, at the terminals of which there is developed oxygen during the electrolysis thereby releasing hydrogen ions in the electrolyte. In that manner the hydrogen ions that have been consumed within the porous cathode are replaced by those newly formed at the anode. During this process the effect of the circulating motion is advantageous, it being caused in the electrolyte by the gaseous oxygen during its formation and its evolution.

The porous frame bodies which may be used in the practice of the present invention may be constituted from a metallic powder of an element selected from the group consisting of those in group VIII and those in group IIB of the periodic table of elements.

In making use of the process of the invention it may be of advantage during the filling of highly porous electrode bodies for galvanic elements or batteries, for the purpose of the increase in capacity of active material retained, to perform the precipitation of the metal hydroxides in two stages or more, using the following procedure:

When constructing a nickel oxide electrode, the pores of the frame body are filled with nickel hydroxide in accordance with the invention and are subsequently dried. The result of the drying is that there is a decrease in the volume of the hydroxide inside of the pores creating thus more void room or volume within the space defined by the pores. During a subsequent repeated cathodic polarization of such interim-dried frame bodies there is additional precipitation of nickel hydroxide in the empty spaces created by the drying, resulting in the desired capacity increase.

When constructing a cadmium electrode the pores of the frame body are filled according to the invention with cadmium hydroxide and the frame body is subsequently electrically connected in an alkaline electrolyte solution bath as a cathode. This results in the reduction of the previously formed cadmium hydroxide into finely dispersed cadmium metal. Inasmuch as the displacement of the metal is lower than the volume of the hydroxide, the reduction furnishes additional space or volume in the space or void of the pores which is filled with additional cadmium hydroxide during a new cathodic polarization of the partly filled frame body.

Consequently, it is possible by using the above described features of the invention to obtain a maximum active material retaining capacity of the thus processed frame body whereby a result of importance is that during the use of electrodes prepared according to the invention, the active masses that have been introduced into the pores participate to practically 100% in the delivery of current of galvanic element or battery equipped with such electrodes. This is not the case when using electrodes that have been produced according to known chemical filling method produced active masses which have been mentioned above.

Due to the fact that when using the process according to the invention the diffusion of ions within the pores of the frame body is of importance, it is advisable to add to the electrolyte a wetting agent such as fatty alcohol sulphonate, in order to reduce the surface tension.

*Example I*

As a specific example of the invention, the following as an application of the process in the manufacture of the electrodes of an alkaline battery is described.

An electrode frame body of porous sintered nickel powder of about 0.65 mm. thickness was connected as a cathode in an electrolyte bath comprising an aqueous solution of nickel nitrate 10% concentration, while a foil of nickel served as the anode. The electrolysis was carried out for such a period of time until the pores of the frame body were filled from inside toward the outside with green bivalent nickel hydroxide. During the electrolysis the pH value of the electrolyte was maintained on the acid side (pH=3) by the addition of nitric acid. Subsequently, the electrode was connected as anode in pure alkaline solution, whereby the bivalent nickel hydroxide was converted into trivalent nickel hydroxide.

The thus built electrode used as a depolarization cathode of an alkaline battery indicated a capacity of 1 to 1.5 ah./dm.$^2$.

The five-hour long precipitation process required about 0.001 kwh./dm.$^2$ of electric energy. Therefore the necessary supply of energy amounts for the electrode filling method according to the invention is a fraction (less than 1%) of that needed during a chemical filling according to methods extant of the same type frame bodies. Another saving is afforded by the use of a considerably lesser amount of chemicals (about 40% saving) than those requisite for such chemical filling.

Furthermore, it is possible to fill the electrode frame body or support when using the method of this present invention in a continuous operation, especially if the porous electrode frame bodies or supports are in the shape of a ribbon.

*Example II*

A cadmium electrode was manufactured in an analogous manner. In that case a sintered porous frame body as thin as a foil (of about 0.65 mm. thickness) consisting of nickel or iron powder served as the cathode which was immersed in an electrolytic bath comprising an acid solution of cadmium nitrate 80% concentration. A cadmium metal electrode served as the anode. Electrolysis was continued for such a period of time until the pores of the frame body were filled from the inside up to the top with cadmium hydroxide. During the electrolysis the pH value was kept on the acid side (pH=1) by the addition of nitric acid. Subsequent to the chemical penetration of the cadmium hydroxide into the pores of the frame body, the latter was treated in pure potash solution, resulting in the reduction of the formed cadmium hydroxide into a finely dispersed porous cadmium metal.

The thus treated frame body showed as a solution anode of an alkaline battery a capacity of 1 to 1.5 ah./dm.²

The advantages listed for a nickel hydroxide electrode are of analogous value for the cadmium electrode. These advantages are therefore:

Low energy consumption when using the method as compared with known chemical filling.
Lower consumption of chemicals as compared with such chemical filling.
Less time needed for the filling of the pores of the frame body with active masses as compared with such chemical filling.
Very fine and even distribution of active masses into the pores of the porous frame body.
100% participation of the active masses of the electrode during the charging and discharging of the battery.

Due to the fine and even distribution of the active masses in the electrodes prepared according to this invention and the 100% participation of these masses in the charging and discharging operations, the electrodes manufactured according to the invention are particularly suitable for batteries which are operated under severe drain and specially with those having high or severe starting drains.

When using batteries which are hermetically sealed against gas escape, the even distribution of the masses distributed into the pores of electrodes prepared according to this invention is of great advantage because it eliminates the formation of hydrogen and oxygen gases to a considerable extent even at higher amperages.

The effective mechanical process of hydroxide precipitation in accordance with the practices of this invention into the pores of the frame body is explainable I believe as follows:

During the cathodic polarization of the porous frame bodies in an electrolyte containing nitrate ions, the reduction of the nitrate ions is the process which carries the current. While absorbing electrons and consuming hydrogen ions, the nitrate ions are converted into nitric oxide, nitrous oxide and hydroxylamine and finally form ammonia which latter produces in combination with water, hydroxide of ammonia, as per the following equations:

(1) $2NO_3^- + 8H^+ + 6\theta = 2NO + 4H_2O$ (nitric oxide)
(2) $2NO + 2H^+ + 2\theta = N_2O + H_2O$ (nitrous oxide)
(3) $N_2O + 4H^+ + 4\theta + H_2O = 2NH_3O$ (hydroxylamine)
(4) $2NH_3O + 4H^+ + 4\theta = 2NH_3 + 2H_2O$ (ammonia)
(5) $2NH_3 + 2H_2O = 2NH_4OH$ (ammonium hydroxide)

As the rough formula there result therefrom:

$$2NO_3^- + 18H^+ + 16\theta = 2NH_4OH + 4H_2O$$

The end product NH₄OH was proven analytically. It was also possible to prove analytically that after electrolysis in an acid cadmium nitrate solution the pores contain cadmium hydroxide.

After electrolysis in an acid nitrate solution the formation of the green bivalent nickle hydroxide in the pores is distinctly visible.

Although the practice of this invention has been described in specific embodiments, variations within the scope of the appended claims are possible and are contemplated. There is no intention therefore of limitation to the exact details hereinabove set forth.

What is claimed is:

1. A process for filling the pores of a porous electrically conductive frame body comprising sintered metal powder of a metal selected from the group consisting of nickel, iron and cadmium with nickel hydroxide which process comprises the steps of immersing said porous frame body and an electrode in an electrolyte bath consisting essentially of an acidified aqueous solution of nickel nitrate and nitric acid and having a pH of about 3, connecting said frame body cathodically and connecting said electrode anodically in an electric circuit, and passing electric current while maintaining the electrolyte bath at about the initial pH by addition of acid thereto during said passage which prevents precipitation of hydroxide of nickel within the bulk of the electrolyte bath.

2. A process for filling the pores of a porous electrically conductive frame body comprising sintered metal powder of a metal selected from the group consisting of nickel, iron and cadmium with cadmium hydroxide, which process comprises the steps of immersing said porous frame body and an electrode in an electrolyte bath consisting essentially of an acidified aqueous solution of cadmium nitrate and nitric acid and having a pH of about 1, connecting said frame body cathodically and connecting said electrode anodically in an electric circuit, and passing electric current through said circuit while maintaining the electrolyte bath at about the initial pH by addition of acid thereto during said passage which prevents precipitation of hydroxide of cadmium within the bulk of the electrolyte bath.

3. A process for filling the pores of a porous electrically conductive frame body comprising sintered nickel powder of a metal selected from the group consisting of nickel, iron and cadmium with nickel hydroxides, which process comprises the steps of immersing the said porous frame body and an electrode in an electrolyte bath consisting essentially of an acidified aqueous solution of nickel nitrate and having a pH value of about 3, connecting said frame body cathodically and connecting said electrode anodically in an electric circuit, and passing electric current through the said circuit while maintaining the electrolyte bath at about the initial pH by addition of acid thereto during said passage which prevents precipitation of hydroxide of nickel within the bulk of the electrolyte bath.

4. A process for filling the pores of a porous electrically conductive frame body comprising sintered metal powder of a metal selected from group consisting of nickel, iron and cadmium with cadmium hydroxide, which process comprises the steps of immersing the said porous frame body and an electrode in an electrolyte bath consisting essentially of an acidified aqueous solution of a cadmium nitrate and having a pH value of about 1, connecting said frame body cathodically and connecting said electrode anodically in an electric circuit, and passing electric current through the said circuit while maintaining the electrolyte bath at about the initial pH by addition of acid thereto during said passage which prevents precipitation of hydroxide of cadmium within the bulk of the electrolyte bath.

5. A process according to claim 3, in which the process of said claim is followed by a step in which the said frame is dried and the frame thereafter is again treated in accordance with the process of claim 3.

6. A porous frame body, the pores of which are filled with nickel hydroxide according to the process of claim 3.

7. A secondary battery comprising as an electrode element a frame body produced in accordance with the process of claim 3.

8. A process according to claim 4 in which the process of said claim is followed by a step in which the said frame is dried and the frame thereafter is again treated in accordance with the process of claim 4.

9. A porous frame body, the pores of which are filled with cadmium hydroxide according to the process of claim 4.

10. A secondary battery comprising as an electrode element a frame body produced in accordance with the process of claim 4.

References Cited by the Examiner

UNITED STATES PATENTS

| | | | |
|---|---|---|---|
| 1,402,751 | 1/22 | Edison | 136—28 |
| 1,442,238 | 1/23 | Smith | 136—28 |
| 2,007,170 | 7/36 | Basca | 136—28 |
| 2,675,418 | 4/54 | Nichols | 136—28 |
| 2,737,541 | 3/56 | Coolidge | 136—28 |

OTHER REFERENCES

Fleischer: Journal of the Electrochemical Society, vol. 94, 1948, pages 293–296.

JOHN H. MACK, *Primary Examiner.*

MURRAY A. TILLMAN, *Examiner.*